(12) United States Patent
Xiao et al.

(10) Patent No.: US 9,095,819 B2
(45) Date of Patent: Aug. 4, 2015

(54) COMPOSITION FOR PREPARATION OF HOLLOW FIBER POROUS MEMBRANE AND PREPARATION METHOD USING THE SAME

(75) Inventors: Changfa Xiao, Tianjin (CN); Xiaoyu Hu, Tianjin (CN); Haixian Liang, Tianjin (CN); Shulin An, Tianjin (CN)

(73) Assignee: Tianjin Polytechnic University, Tianjin (CN)

( * ) Notice: Subject to any disclaimer, the term of this patent is extended or adjusted under 35 U.S.C. 154(b) by 1106 days.

(21) Appl. No.: 13/037,389

(22) Filed: Mar. 1, 2011

(65) Prior Publication Data

US 2011/0147300 A1 Jun. 23, 2011

Related U.S. Application Data

(63) Continuation of application No. PCT/CN2009/070721, filed on Mar. 10, 2009.

(30) Foreign Application Priority Data

Sep. 1, 2008 (CN) .......................... 2008 1 0151201

(51) Int. Cl.
| | |
|---|---|
| *B01D 69/08* | (2006.01) |
| *B01D 71/54* | (2006.01) |
| *B01D 71/30* | (2006.01) |
| *B01D 67/00* | (2006.01) |
| *B01D 63/02* | (2006.01) |
| *B01D 71/34* | (2006.01) |

(52) U.S. Cl.
CPC .............. *B01D 69/08* (2013.01); *B01D 67/002* (2013.01); *B01D 69/087* (2013.01); *B01D 71/30* (2013.01); *B01D 71/34* (2013.01); *B01D 71/54* (2013.01); *B01D 2323/08* (2013.01); *B01D 2323/12* (2013.01)

(58) Field of Classification Search
None
See application file for complete search history.

(56) References Cited

U.S. PATENT DOCUMENTS

| | | | | |
|---|---|---|---|---|
| 4,399,035 A | * | 8/1983 | Nohmi et al. | ............ 210/500.23 |
| 5,489,406 A | * | 2/1996 | Beck et al. | ...................... 264/41 |
| 2008/0156722 A1 | * | 7/2008 | Suzuki et al. | ............ 210/500.36 |

OTHER PUBLICATIONS

CN 101053778 A—English translation of Chinese patent—Oct. 2007.*
CN 1128176 A—English translation of Chinese patent—Aug. 1996.*
PCT-371-IPER—2011.*

* cited by examiner

*Primary Examiner* — Krishnan S Menon
(74) *Attorney, Agent, or Firm* — Matthias Scholl P.C.; Matthias Scholl

(57) ABSTRACT

A composition for preparation of a hollow fiber porous membrane including 40-60 wt. % a polymer matrix, 20-30 wt. % an organic mixed solution, and 20-40 wt. % a water-soluble substance. The polymer matrix is a polymer capable of dissolving in an organic solvent and melt processing. The organic mixed solution is a mixture comprising 60-90 wt. % a first liquid soluble to the polymer matrix and 10-40 wt. % a second liquid insoluble to the polymer matrix. The water-soluble substance is a water-soluble polymer, a low molecular weight water-soluble particle, or a mixture thereof. A method for producing the hollow fiber porous membrane using the composition including a) preparing the organic mixed solution, b) mixing the components of the composition, c) applying melt spinning, d) drawing, and e) washing. The hollow fiber membrane has high strength, large flux, and low cost.

8 Claims, No Drawings

COMPOSITION FOR PREPARATION OF HOLLOW FIBER POROUS MEMBRANE AND PREPARATION METHOD USING THE SAME

CROSS-REFERENCE TO RELATED APPLICATIONS

This application is a continuation of International Patent Application No. PCT/CN2009/070721 with an international filing date of Mar. 10, 2009, designating the United States, now pending, and further claims priority benefits to Chinese Patent Application No. 200810151201.6 filed Sep. 1, 2008. The contents of all of the aforementioned applications, including any intervening amendments thereto, are incorporated herein by reference.

BACKGROUND OF THE INVENTION

1. Field of the Invention

The invention relates to a composition for preparation of a hollow fiber porous membrane and a preparation method using the same. The hollow fiber porous membrane has high strength and large flux and the preparation method thereof involves melt spinning process.

2. Description of the Related Art

Conventional hollow fiber porous membranes and preparation methods thereof are well known to those skilled in the art. For example, hard elastic polymers, such as PP (polypropylene) and PE (polyethylene), are common materials to produce hollow fiber porous membrane. Specifically, PP as a bulk polymer is melted directly and treated using a spinning pack to yield a hollow fiber. Upon stability in structure, the hollow fiber is drawn and thus a microphase separation between the crystal region and the amorphous region therein happens, thereby resulting in the formation of a micropore structure. However, the resulting hollow fiber porous membrane has low porosity, poor hydrophilicity, and low water flux, mainly used for preparation of gas separation membrane, for example, artificial lung.

A method for producing a polyvinylidene difluoride porous membrane includes mixing a polyvinylidene difluoride resin and an organic liquid with an inorganic aggregate, melting the resulting mixture at a temperature which is 60° C. or more higher than the melting point of the resin, extruding the mixture, and applying an air bath. The method requires a high spinning temperature (as mentioned above, a temperature of 60° C. or more higher than the melting point of the polymer matrix) and the organic liquid used therein is a poor solvent of the polymer at room temperature. To improve water flux, a large amount of the organic liquid is a must, thereby worsening the spinnability of the mixture. Thus, the method is not so practicable.

A method for producing a hollow fiber membrane in the prior art includes mixing a polymer, a liquid insoluble to the polymer, and a polymeric pore forming agent with a surfactant, and then melting (at a temperature of 10-50° C. higher than the melting point of the polymer) and extruding the mixture to yield a hollow fiber membrane. To make the follow fiber membrane have permeable micropores, the liquid is washed using an organic solvent such as isopropyl alcohol and ethanol. The introduction of the organic solvent increases the production cost and even causes secondary pollution. Another method for producing a hollow fiber membrane includes mixing a polymer and a polymeric pore forming agent with a diluent, and then melting the mixture. Due to the compatibility difference of the water-soluble polymers used therein, for example, polyoxyethylene and polyvinylidene difluoride (PVDF), and the viscosity difference thereof at a spinning temperature, a uniform porous structure is very difficult to form. Thus, the comprehensive properties of the PVDF hollow fiber porous membrane decrease greatly.

SUMMARY OF THE INVENTION

In view of the above-described problems, it is one objective of the invention to provide a composition for preparation of a hollow fiber porous membrane and a preparation method using the same. The hollow fiber porous membrane features high strength, large flux, and low cost, and is suitable for production using melt spinning process. Likewise, the preparation method is easy for practice and involves low cost.

To achieve the above objective, in accordance with one embodiment of the invention, there is provided a composition for preparation of a hollow fiber porous membrane, the composition comprising a polymer matrix 40-60 wt. %;
an organic mixed solution 20-30 wt. %, and
a water-soluble substance 20-40 wt. %;
wherein the polymer matrix is a polymer capable of dissolving in an organic solvent and melt processing; the organic mixed solution is a mixture comprising 60-90 wt. % a first liquid soluble to the polymer matrix and 10-40 wt. % a second liquid insoluble to the polymer matrix; the water-soluble substance is a water-soluble polymer, a low molecular weight water-soluble particle, or a mixture thereof.

In a class of this embodiment, the first liquid is dimethylacetamide, dimethylformamide, or dimethylsulfoxide.

In a class of this embodiment, the second liquid is polysorbate, tetraethylene glycol, triethylene glycol, 1,3-butanediol, 1,4-butanediol, water, or a mixture thereof In a class of this embodiment, the water-soluble polymer is polyethylene oxide, polyvinyl pyrrolidone, polyethylene glycol, polyvinyl alcohol, or a mixture thereof.

In a class of this embodiment, the low molecular weight water-soluble particle is a micron inorganic particle and/or a micron organic particle.

In a class of this embodiment, the micron inorganic particle is lithium chloride, potassium chloride, sodium chloride, calcium chloride, or a mixture thereof.

In a class of this embodiment, the micron organic particle is urea, sucrose, sodium glutamate, or a mixture thereof.

In accordance with another embodiment of the invention, there provided is a method for producing a hollow fiber porous membrane using the composition, the method comprising the steps of:

a) uniformly mixing the first liquid with the second liquid in above-mentioned proportion to yield the organic mixed solution;

b) if the low molecular weight water-soluble particle used as the water-soluble substance, uniformly mixing the low molecular weight water-soluble particle with the organic mixed solution in above-mentioned proportion, and then mixing a resulting mixture with the polymer matrix; or, if the water-soluble polymer used as the water-soluble substance, uniformly mixing the polymer matrix with the water-soluble polymer in above-mentioned proportion, and then mixing a resulting mixture with the organic mixed solution; or, if the low molecular weight water-soluble particle and the water-soluble polymer both used as the water-soluble substance, mixing the polymer matrix with the water-soluble polymer and mixing the low molecular weight water-soluble particle with the organic mixed solution, respectively, and then mixing the resulting two mixtures uniformly;

c) melting an obtained mixture from step b) at a melting temperature of the polymer matrix±30° C., and extruding using a hollow fiber spinning pack; and d) drawing an extrudant from step c) through a 15-100 mm steam bath or air bath, followed by through a first bath and a second bath, and washing the extrudant with water for more than 2 h under a tension for fixing length of follow fiber membrane; the first bath being a cold water bath and the second bath being an air bath, water bath, oil bath, or steam bath, with a temperature≥20° C.

Advantages of the invention are summarized below. The method for producing the hollow fiber porous membrane involves no post-drawing and the washing process involved therein is very easy (just water is enough), thereby resulting in low cost. The method comprises melt spinning, cooling separation, gel drawing, and pore formation. Thus, the hollow fiber membrane has high strength and large flux. The method features a low spinning temperature (the temperature is controlled at the proximity of the melting temperature of the polymer matrix), continuous process (no post-drawing involved), and simple washing (just water involved). Thus, the method has low cost and is easy for industrialization.

DETAILED DESCRIPTION OF THE EMBODIMENTS

For further illustrating the invention, experiments detailing a composition for preparation of a hollow fiber membrane and a preparation method using the same are described below. It should be noted that the following examples are intended to describe and not to limit the invention.

A composition for preparation of a hollow fiber porous membrane comprises a polymer matrix 40-60 wt. %;
an organic mixed solution 20-30 wt. %, and
a water-soluble substance 20-40 wt. %.

The polymer matrix is a polymer capable of dissolving in an organic solvent and melt processing. The organic mixed solution is a mixture comprising 60-90 wt. % a first liquid soluble to the polymer matrix and 10-40 wt. % a second liquid insoluble to the polymer matrix. The first liquid is dimethylacetamide, dimethylformamide, or dimethylsulfoxide. The second liquid is polysorbate, tetraethylene glycol, triethylene glycol, 1,3-butanediol, 1,4-butanediol, water, or a mixture thereof. The water-soluble substance is a water-soluble polymer, a low molecular weight water-soluble particle, or a mixture thereof. The water-soluble polymer is polyethylene oxide (PEO), polyvinyl pyrrolidone (PVP), polyethylene glycol (PEG), polyvinyl alcohol (PVA), or a mixture thereof. The low molecular weight water-soluble particle is a micron inorganic particle and/or a micron organic particle. The micron inorganic particle is lithium chloride, potassium chloride, sodium chloride, calcium chloride, or a mixture thereof. The micron organic particle is urea, sucrose, sodium glutamate, or a mixture thereof.

Preferably, the polymer matrix is polyvinylidene difluoride (PVDF), polyurethane (PU), or polyvinyl chloride (PVC).

In certain embodiments of the invention, the first liquid is dimethylacetamide (DMAc), dimethylformamide (DMF), or dimethylsulfoxide (DMSO). The second liquid has a high boiling point and poor compatibility with the polymer matrix, but has a good dissolubility with water and the first liquid used in the invention. Furthermore, the second liquid should ensure the organic mixed solution made therewith relatively stable at the melting temperature of the composition. The second liquid is polysorbate, tetraethylene glycol, triethylene glycol, 1,3-butanediol, 1,4-butanediol, water, or a mixture thereof. The selection of the second liquid is one of the key technologies of the invention. The functions of the second liquid are described as below. First, the mixing of the second liquid with the first liquid yields the organic mixed solution which exhibits good compatibility with the polymer matrix and the water-soluble polymer such as polyethylene oxide, polyvinyl pyrrolidone, polyethylene glycol, polyvinyl alcohol, and the organic mixed solution is relatively stable at the melting temperature of the composition. Thus, the organic mixed solution, the polymer matrix, and the water-soluble polymer form a stable and uniform mixture, which not only solves the nonuniformity resulted from the mixing of the polymer matrix and the water-soluble polymer, but also reduces the plastics flow temperature of the composition, improves the spinnability of the composition, and reduces the spinning temperature. Second, when the temperature decreases after the hollow membrane is extruded from the spinneret hole, the second liquid promotes the microphase separation between the organic mixed solution and the polymer matrix, which benefits the formation of the permeable porous structure of the hollow fiber membrane. Third, the second liquid has good water-solubility, and is easily mixed with the first liquid to yield the organic mixed solution. The organic mixed solution, together with other water-soluble components, is easily removed using washing, which improves the porosity of the hollow fiber membrane. To achieve the above objectives, the first liquid should account for 60-90 wt. % of the organic mixed solution in content. If the content is lower than that, the porosity of the hollow fiber membrane will decrease. If the content is higher than that, the compatibility between the organic mixed solution and the polymer matrix will be poor, and the spinning of the composition will be unstable. Furthermore, the total amount of the organic mixed solution should be 20-30 wt. % of that of the composition. If the content is lower than that, the plasticity of the composition is not complete, thereby affecting the processing properties thereof. If the content is higher than that, the strength of the obtained hollow fiber membrane will decrease quickly.

The water-soluble polymer and the low molecular weight water-soluble particle should meet the following conditions: first, good water solubility; second, no chemical changes involved in the process of spinning; third, the water solubility thereof not affected in the process of spinning Thus, the water-soluble polymer is polyethylene oxide, polyvinyl pyrrolidone, polyethylene glycol, polyvinyl alcohol, or a mixture thereof. The low molecular weight water-soluble particle is a micron inorganic particle, such as lithium chloride, potassium chloride, sodium chloride, calcium chloride, or a mixture thereof, or a micron organic particle (prepared by low temperature grinding), such as urea (with a melting point of 130° C.), sucrose (with a melting point of 186° C.), sodium glutamate (with a melting point of 225° C.), or a mixture thereof. Studies show that, the more the soluble components of the composition, the more uniform the distribution thereof, the bigger the water flux of the hollow fiber membrane, but the mechanical strength, the support properties, and the uniformity of the membrane pore get worse. Thus, the polymer matrix should account for 40 wt. % or more of the composition, and the soluble substance should account for 30 wt. % or more of the polymer matrix. The average molecular weight of the water-soluble polymer has an important influence on the porous structure of the hollow fiber membrane. If the molecular weight is low, the viscosity of the polymer is low, and thus the permeability of the membrane pore get worse, thereby reducing the water flux of the hollow fiber membrane. The average particle size of the low molecular weight water-soluble particle should be controlled not more than 10 micron, otherwise, the spinnability of the composition is poor, and a uniform and stable hollow fiber membrane cannot be obtained. Obviously, nanometer-graded water-soluble polymer and low molecular weight water-soluble particle is better for the invention, but the production cost is very high accordingly.

The composition comprises three components, i.e., the polymer matrix, the organic mixed solution, and the water-soluble substance. When producing the hollow fiber membrane, the mixing order of the three components is very important. Specifically, if the low molecular weight water-soluble particle used as the water-soluble substance, the low molecular weight water-soluble particle is first mixed with the organic mixed solution so that the low molecular weight water-soluble particle absorbs the organic liquid sufficiently, and then the resulting mixture is mixed with the polymer matrix. Studies show that, the mixing order greatly improves the spinnability, the porosity, and the mechanical strength of the hollow fiber membrane. If the water-soluble polymer used as the water-soluble substance, the polymer matrix is first mixed with the water-soluble polymer, and then the resulting mixture is mixed with the organic mixed solution. Thus, the organic mixed solution is uniformly absorbed by the two polymers. Studies show that, the mixing order is beneficial to obtain a uniform and stable hollow fiber membrane. If the low molecular weight water-soluble particle and the water-soluble polymer both used as the water-soluble substance, the polymer matrix is first mixed with the water-soluble polymer and the low molecular weight water-soluble particle is mixed with the organic mixed solution, respectively, and then the resulting two mixtures are mixed uniformly.

The melt mixing is achieved using a reactor or a twin-screw extruder. The melt spinning is achieved using a hollow fiber spinning pack. The melt spinning temperature is controlled at the proximity of the melting temperature of the polymer matrix, i.e., the melting temperature of the polymer matrix±30° C. Too high or too low temperature makes the spinnability of the composition get worse, thereby affecting the external appearance and internal properties of the hollow fiber membrane. Low melt spinning temperature is one of the key technologies of the invention.

After the composition is spun into the hollow fiber, the latter should experience a certain distance or length of a steam bath or air bath, which benefits the primary gelation of the surface of the hollow fiber membrane, stabilizes the geometric shape of the membrane, delays the outflow of the water-soluble substance, and improves the porosity of the hollow fiber membrane. The steam bath or air bath is 15-100 mm, preferably 30 mm. If the distance or length is less than 15 mm, the water flux of the membrane decreases. If the distance exceeds 100 mm, due to gravity, the stability of the spinning and uniformity of the hollow membrane get worse.

Following the steam bath or air bath, the hollow fiber is continued drawing using two baths with different temperatures, which is one of the key technologies of the invention to produce high-strength and large flux hollow membrane. The first bath is a cold water bath where the temperature decreases quickly, so that the microphase separation between the polymer matrix and the organic mixed solution happens quickly, the motion of the polymer matrix molecules is inhibited, the viscosity of the composition improves quickly, and the outflow of the water-soluble substance is inhibited (herein the hollow fiber membrane which has been cured but comprises some organic liquid and water-soluble substance is called a gel fiber). The second bath is a warm water bath with temperature of more than 20° C., where the gel fiber is further drawn (the draw ratio is 105-500%, in examples the draw ratio is 200%) to ensure the draw complete and destroy the dense layer formed on the surface thereof. The second bath can also promote the formation of the porous structure of the hollow fiber membrane, and recombine and optimize the microphase pore of the gel fiber formed in the first bath. The second bath is a water bath, oil bath, steam bath, or air bath, preferably, a water bath or an oil bath. The bath is very important for the quality and properties of the follow fiber membrane.

In the invention, the gel fiber needs washing using a water bath for more than 2 hrs under a tension for fixing length of hollow fiber membrane. Water is the sole extracting agent, or prior to washing using water, the fiber is washed with an aqueous solution comprising a hydrophilic organic reagent, for example, 1-98 wt. % ethanol aqueous solution. By washing, the low molecular weight components in the gel fiber are removed. By the second oil bath, the hydrophobic components are removed. Thus, the hollow membrane is obtained.

The hollow membrane can be post-drawn using conventional methods to improve the water flux. The post-draw is generally up to 110%, but not a must. Thus, the method of the invention is very simple for practice.

EXAMPLE 1

A composition comprising 40 wt. % polyvinylidene difluoride (PVDF), 30 wt. % polyethylene oxide (PEO) (molecular weight: 100,000), and 30 wt. % an organic mixed solution (a mixture of dimethylsulfoxide (DMSO) as a first liquid and polysorbate-80 as a second liquid, with 60 wt. % DMSO) was mixed uniformly at 160° C. using a twin-screw extruder or reactor and extruded using a hollow fiber spinning pack. The extrudant was drawn through a 30 mm saturated steam bath at 30° C., and then through a cold water bath and a second stream bath at 30° C. The ratio of the fiber-drawing speed to the fiber-introducing speed of the cold water bath was 2:1. After that, the extrudant was washed with water for 2.5 h under a tension for fixing length of the follow fiber membrane. Thus, a hollow fiber membrane was obtained.

Measurement results showed that, at 0.1 MPa and 25° C., the water flux of the hollow fiber membrane was 3150 ($L \cdot m^{-2} \cdot h^{-1}$).

EXAMPLE 2

Following Example 1 except that the second bath was a glycerin bath and a silicone oil bath, respectively. Measurement results showed that, at 0.1 MPa and 25° C., the water flux of the hollow fiber membrane was 3260 ($L \cdot m^{-2} \cdot h^{-1}$) and 980 ($L \cdot m^{-2} \cdot h^{-1}$), respectively.

Following Example 1 except that the second bath was a silicone oil bath, prior to being washed with water, the hollow fiber membrane was washed with 98 wt. % ethanol aqueous solution, the silicone oil removed, and then washed with water. Measurement results showed that, at 0.1 MPa and 25° C., the water flux of the hollow fiber membrane was 3250 ($L \cdot m^{-2} \cdot h^{-1}$).

EXAMPLE 3

Following Example 1 except that the 30 mm saturated stream bath at 30° C. was substituted with an air bath at 30° C.

Measurement results showed that, at 0.1 MPa and 25° C., the water flux of the hollow fiber membrane was 2890 ($L \cdot m^{-2} \cdot h^{-1}$).

EXAMPLE 4

Following Example 1 except that the composition comprises 50 wt. % PVDF, 30 wt. % a water-soluble substance (i.e., a mixture of PEO (molecular weight: 100,000) and micron sodium chloride with a ratio of 1:1), and 20 wt. % an organic mixed solution (a mixture of DMSO as a first liquid and polysorbate-80 as a second liquid, with 90 wt. % DMSO).

Measurement results showed that, at 0.1 MPa and 25° C., the water flux of the hollow fiber membrane was 1987 ($L \cdot m^{-2} \cdot h^{-1}$).

EXAMPLE 5

Following Example 1 except that the composition comprises 50 wt. % PVDF, 30 wt. % a water-soluble substance PEO (molecular weight: 100,000), and 20 wt. % an organic mixed solution (a mixture of DMSO as a first liquid and polysorbate-80 as a second liquid, with 90 wt. % DMSO).

Measurement results showed that, at 0.1 MPa and 25° C., the water flux of the hollow fiber membrane was 2030 ($L \cdot m^{-2} \cdot h^{-1}$).

EXAMPLE 6

Following Example 1 except that the first liquid was DMAc and DMF, respectively.

Measurement results showed that, at 0.1 MPa and 25° C., the water flux of the hollow fiber membrane was 2025 and 2033 ($L \cdot m^{-2} \cdot h^{-1}$), respectively.

EXAMPLE 7

Following Example 1 except that the composition comprises 60 wt. % PVDF, 20 wt. % micron sodium chloride (average particle size: 2 μm), and 20 wt. % an organic mixed solution (a mixture of DMAc as a first liquid and polysorbate-80 as a second liquid, with 83 wt. % DMAc).

Measurement results showed that, at 0.1 MPa and 25° C., the water flux of the hollow fiber membrane was 860 ($L \cdot m^{-2} \cdot h^{-1}$).

EXAMPLE 8

Following Example 1 except that the water-soluble polymer was PVP (K25), PEG (20,000), and PVA (degree of polymerization, 1200; alcoholysis, 68), respectively.

Measurement results showed that, at 0.1 MPa and 25° C., the water flux of the hollow fiber membrane was 2135, 2250, and 1185 ($L \cdot m^{-2} \cdot h^{-1}$), respectively.

EXAMPLE 9

Following Example 1 except that the composition comprises 40 wt. % PVDF, 40 wt. % micron sodium chloride (average particle size: 2 μm), and 20 wt. % an organic mixed solution (a mixture of DMAc as a first liquid and polysorbate-80 as a second liquid, with 83 wt. % DMAc). Measurement results showed that, at 0.1 MPa and 25° C., the water flux of the hollow fiber membrane was 4846 ($L \cdot m^{-2} \cdot h^{-1}$). The hollow fiber membrane was further post-drawn for 110% and 150%, respectively.

Measurement results showed that, at 0.1 MPa and 25° C., the water flux of the hollow fiber membrane was 5846 and 7950 ($L \cdot m^{-2} \cdot h^{-1}$).

EXAMPLE 10

Following Example 1 except that the second liquid polysorbate-80 was substituted with tetraethylene glycol, triethylene glycol, 1,3-butanediol, 1,4-butanediol, and water, respectively.

Measurement results showed that, at 0.1 MPa and 25° C., the water flux of the hollow fiber membrane was 3346, 3465, 3473, 3376, and 3630 ($L \cdot m^{-2} \cdot h^{-1}$), respectively.

EXAMPLE 11

Following Example 9 except that the polymer matrix was PU and PVC, respectively, and the melt spinning temperature of PU was 150° C., the melt spinning temperature of PVC was 130° C.

Measurement results showed that, at 0.1 MPa and 25° C., the water flux of the hollow fiber membrane was 3145 and 2310 ($L \cdot m^{-2} \cdot h^{-1}$), respectively.

EXAMPLE 12

Following Example 9 except that the micron sodium chloride was substituted with lithium chloride, potassium chloride, and calcium chloride, respectively.

Measurement results showed that, at 0.1 MPa and 25° C., the water flux of the hollow fiber membrane was 4846, 4838, and 4840 ($L \cdot m^{-2} \cdot h^{-1}$), respectively.

EXAMPLE 13

Following Example 9 except that the micron sodium chloride was substituted with micron urea, sucrose, and sodium glutamate (prepared by low temperature grinding), respectively.

Measurement results showed that, at 0.1 MPa and 25° C., the water flux of the hollow fiber membrane was 3345, 4538, and 4535 ($L \cdot m^{-2} \cdot h^{-1}$), respectively.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for producing a hollow fiber membrane from a composition, said composition comprising, based on the weight of said composition, from 40% to 60% by weight of a polymer matrix, from 20% to 30% by weight of an organic mixed solution, and from 20% to 40% by weight of a water-soluble substance;

wherein:
  said polymer matrix is selected from the group consisting of polyurethane and polyvinyl chloride;
  said organic mixed solution comprises, based on the weight of said organic mixed solution, from 60% to 90% by weight of a first liquid and from 10% to 40% by weight of a second liquid;
  said first liquid is selected from the group consisting of dimethylacetamide, dimethylformamide, and dimethylsulfoxide;
  said second liquid is selected from the group consisting of 1,3-butanediol, 1,4-butanediol, and a mixture thereof;
  said water-soluble substance is selected from the group consisting of a first water-soluble compound, a second water-soluble compound, and a mixture thereof;

said first water-soluble compound is selected from the group consisting of lithium chloride, potassium chloride, sodium chloride, calcium chloride, urea, sucrose, sodium glutamate, and a mixture thereof; and said second water-soluble compound is selected from the group consisting of polyethylene oxide, polyvinyl pyrrolidone, polyethylene glycol, polyvinyl alcohol, and a mixture thereof;

the method comprising the steps of:
a) mixing said first liquid with said second liquid to yield said an organic mixed solution;
b)(i) if said first water-soluble compound is used as said water-soluble substance, mixing said first water-soluble compound with said organic mixed solution to obtain a first mixture, and then mixing said first mixture with said polymer matrix to obtain said composition;
b)(ii) if said second water-soluble compound is used as said water-soluble substance, mixing said polymer matrix with said water-soluble polymer to obtain a second mixture, and then mixing said second mixture with said organic mixed solution to obtain said composition; or,
b)(iii) if said first and second water-soluble compounds are both used as said water-soluble substance, mixing said first and second mixtures to obtain said composition;
c) melting said composition at a melting temperature of said polymer matrix ±30° C., and extruding said composition to obtain an extrudant in a shape of a hollow filament; and
d) drawing said extrudant through an air gap of 15-100 mm in a first bath, subjecting said extrudant to a second bath and a third bath to solidify said polymer matrix in said extrudant, and washing said extrudant with water for more than 2 h to dissolve said organic mixed solution and said water-soluble substance out of said extrudant, whereby forming pores on said extrudant and obtaining said hollow fiber membrane; said first bath being a steam bath or air bath, said second bath being a cold water bath, and said third bath being an air bath, water bath, oil bath, or steam bath at a temperature ≥20° C.

2. The method of claim 1, wherein said air gap has a distance of 30 mm.

3. The method of claim 1, wherein said second bath is a steam bath or oil bath.

4. The method of claim 1, wherein prior to washing with water, said extrudant is washed with a 1-98 wt. % ethanol aqueous solution.

5. A method for producing a hollow fiber membrane from a composition, said composition comprising, based on the weight of said composition,
from 40% to 60% by weight of a polymer matrix,
from 20% to 30% by weight of an organic mixed solution, and
from 20% to 40% by weight of a first water-soluble compound, or a mixture of the first water-soluble compound and a second water-soluble compound;

wherein:
said polymer matrix is selected from the group consisting of polyurethane and polyvinyl chloride;
said organic mixed solution comprises, based on the weight of said organic mixed solution, from 60% to 90% by weight of a first liquid and from 10% to 40% by weight of a second liquid;
said first liquid is selected from the group consisting of dimethylacetamide, dimethylformamide, and dimethylsulfoxide;
said second liquid is selected from the group consisting of 1,3-butanediol, 1,4-butanediol, and a mixture thereof;
said first water-soluble compound is selected from the group consisting of urea, sucrose, sodium glutamate, and a mixture thereof; and
said second water-soluble compound is selected from the group consisting of polyethylene oxide, polyvinyl pyrrolidone, polyethylene glycol, polyvinyl alcohol, and a mixture thereof;

the method comprising:
a) mixing said first liquid with said second liquid to yield said organic mixed solution;
b)(i) if said first water-soluble compound is used, mixing said first water-soluble compound with said organic mixed solution to obtain a first mixture, and then mixing said first mixture with said polymer matrix to obtain said composition; or,
b)(ii) if said first and second water-soluble compounds are both used, mixing said first water-soluble compound with said organic mixed solution to obtain said first mixture, mixing said polymer matrix with said second water-soluble substance to obtain a second mixture, and mixing said first mixture and said second mixture to obtain said composition;
c) melting said composition at a melting temperature of said polymer matrix ±30° C., and extruding said composition to obtain an extrudant in a shape of a hollow filament; and
d) drawing said extrudant through an air gap of 15-100 mm in a first bath, subjecting said extrudant to a second bath and a third bath to solidify said polymer matrix in said extrudant, and washing said extrudant with water for more than 2 h to dissolve said organic mixed solution and said water-soluble substance out of said extrudant, whereby forming pores on said extrudant and obtaining said hollow fiber membrane; said first bath being a steam bath or air bath, said second bath being a cold water bath, and said third bath being an air bath, water bath, oil bath, or steam bath at a temperature >20° C.

6. The method of claim 5, wherein said air gap has a distance of 30 mm.

7. The method of claim 5, wherein said second bath is a steam bath or oil bath.

8. The method of claim 5, wherein prior to washing with water, said extrudant is washed with a 1-98 wt. % ethanol aqueous solution.

* * * * *